March 11, 1924.  1,486,125
J. E. CROCKETT
MACHINE FOR UNITING PIPE SECTIONS
Filed Aug. 2, 1920  2 Sheets-Sheet 1
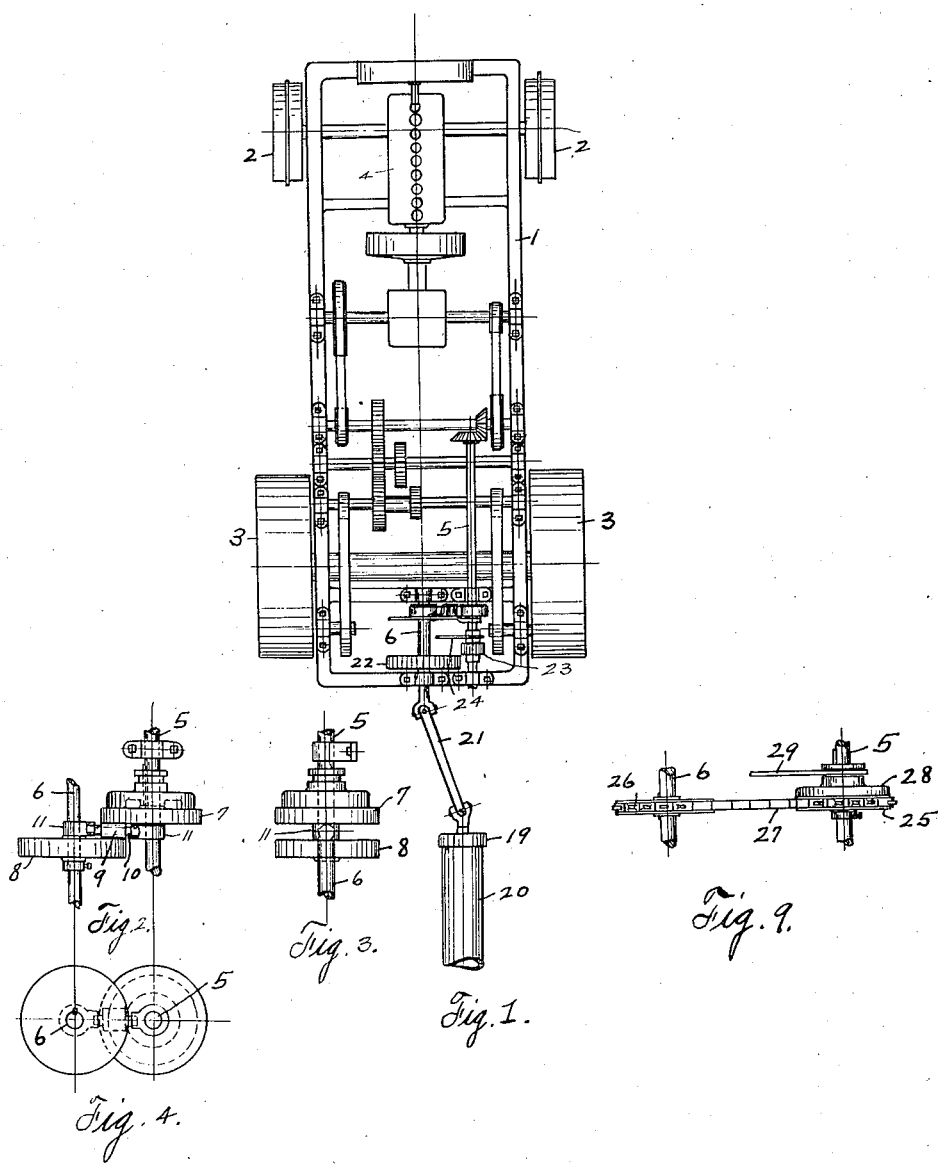
INVENTOR.
Jesse E. Crockett
BY
Hardway Cathey
ATTORNEYS March 11, 1924.
J. E. CROCKETT
1,486,125
MACHINE FOR UNITING PIPE SECTIONS
Filed Aug. 2, 1920　　2 Sheets-Sheet 2
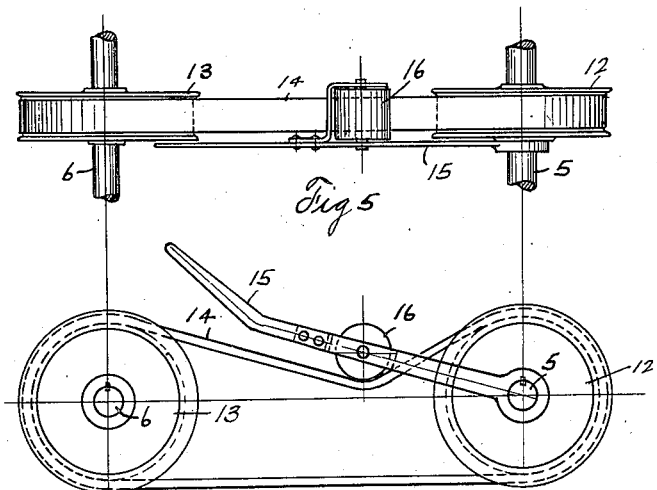
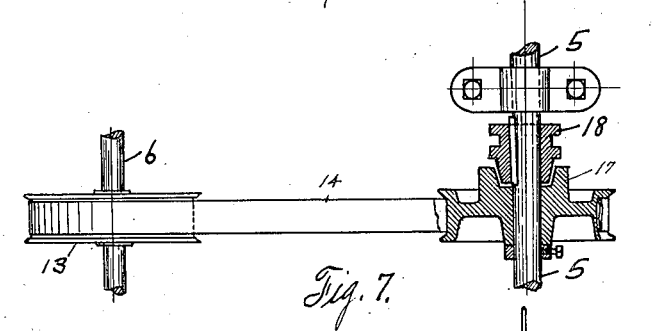
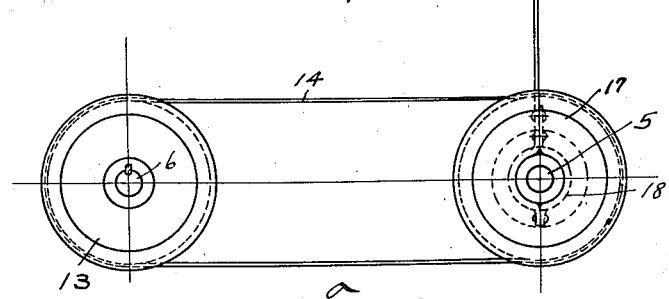
INVENTOR.
Jesse E. Crockett
BY
Hardaway & Cathy
ATTORNEYS.

Patented Mar. 11, 1924.

1,486,125

UNITED STATES PATENT OFFICE.

JESSE E. CROCKETT, OF HUMBLE, TEXAS.

MACHINE FOR UNITING PIPE SECTIONS.

Application filed August 2, 1920. Serial No. 400,812.

*To all whom it may concern:*

Be it known that I, JESSE E. CROCKETT, a citizen of the United States, residing at Humble, in the county of Harris and State of Texas, have invented certain new and useful Improvements in a Machine for Uniting Pipe Sections, of which the following is a specification.

This invention relates to new and useful improvements in a machine for uniting pipe sections.

One object of the invention is to provide a machine of the character described which is specially adapted for use in laying pipe lines and is specifically designed for screwing the joints together.

Another object of the invention is to provide a machine of the character described wherein the driving member may be connected to the driven member through a driving connection which will transmit only a predetermined amount of power, and when the load becomes excessive, said connection will slip. The pipe line is laid by screwing together sections of pipe and additional sections are screwed onto the line as the work progresses. In screwing these additional sections on by machinery, if the threads become crossed, they will be entirely ruined, if the power delivered in screwing up the sections, is sufficient to screw the section home. It is therefore desirable to provide a mechanism which will deliver only a predetermined amount of power to the driven member so that in case the threads should become crossed it will lock the driven member against rotation and the connecting means, connecting the driving member with the driven member, will slip and not transmit further power to said driven member. The mechanism herein described is intended for the purpose above specified.

Another object of the invention is to provide a machine of the character described wherein the driving member may be positively connected with the driven member so that when the threads of the joint to be connected to the line are properly meshed with threads of the line, then said section may be positively turned and completely screwed onto the rest of the line.

With the above and other objects in view the invention has particular relation to certain novel features of construction, operation and arrangement of parts, an example of which is given in this specification and illustrated in the accompanying drawings, wherein:—

Figure 1 is a plan view of the complete device.

Figures 2, 3 and 4 show, respectively, plan, side and end views of the mechanism for connecting the driving and driven members.

Figures 5 and 6 show plan and side views, respectively, of another form of connecting mechanism, and Figures 7 and 8 show plan and side views, respectively, of still another form of connecting mechanism, Figure 7 being shown partially in section, and Figure 9 shows still another form of connecting mechanism.

Referring now more particularly to the drawings wherein like numerals of reference designate similar parts in each of the figures, the numeral 1 refers to a suitable frame-work which is supported upon the front wheels 2, 2 and the rear or traction wheels 3, 3. If it is desired the ordinary caterpillar tractors may be substituted for the traction wheels 3. The frame-work supports a motor 4 of conventional construction, and also supports the usual mechanism for transmitting power from the motor to the tractor wheels. The numeral 5 designates a driving shaft, and the numeral 6 designates a driven shaft. The driving shaft is operatively connected with the motor and is driven thereby and is connected with and drives the shaft 6.

One form of connecting mechanism is shown in Figures 2, 3 and 4. In this form of connecting mechanism the shaft 5 has a driving disc 7, and upon the shaft 6 there is fixed a driven disc 8. These discs overlap, as shown in Figure 2, and interposed between the overlapping edges thereof there is a roller 9 which is fixed upon the short shaft 10, whose ends have bearings in the bearing members 11, 11 which are loosely mounted upon the respective shafts 5 and 6. The roller 9 is in frictional contact with the discs 7 and 8 and is driven by the former and transmits rotation to the latter and to the shaft 6 whereon the same is mounted. This form of driving connection will carry a fixed load, but should the load exceed its capacity it will slip and the driven disc will not be rotated.

In the form shown in Figures 5 and 6 there are aligned pulleys 12 and 13 fixed upon the respective shafts 5 and 6 and operating over them there is a belt 14. Loosely mounted upon the shaft 5 there is a manual lever 15, which has the tension roller 16 rotatably mounted thereon. When it is desired to transmit rotation to the driven shaft 6, the lever 15 is forced down manually and the roller 16 will contact with the belt 14 causing the same to frictionally engage with and turn the pulley 13 and the shaft 6 whereon the same is mounted, but when the predetermined load is exceeded said belt will slip, thus preventing the turning of the pulley 13.

In the form shown in Figures 7 and 8 there is a pulley 17 loosely mounted on the shaft 5 and the belt 14 operates over this pulley and the aligned pulley 13. A cone-shaped clutch 18 is splined on the shaft 6 and arranged to be frictionally engaged with the pulley 17 causing the same to rotate and drive the pulley 13, and the shaft whereon the same is fixed, through the belt 14 but when the load to be carried is exceeded this clutch will slip.

In the form shown in Figure 9 there is a sprocket wheel 25 loosely mounted on the shaft 5 and a similar sprocket wheel 26 is fixed on the shaft 6 in alignment with the sprocket wheel 25 and operating over said sprocket wheels, to transmit rotation from the former to the latter, there is a sprocket chain 27. Splined on the shaft 5 there is a friction wheel 28 which may be manipulated into and out of frictional contact with the wheel 25. When said friction wheel 28 is in contact with the wheel 25 rotation will be imparted, through the mechanism described to the shaft 6, but when the predetermined load, carried by said last mentioned shaft, is exceeded the friction wheel 28 will slip and will cease to drive the shaft 6.

The numeral 19 refers to a pipe engaging head of well known construction which is connected to the end of the joint 20, which is to be screwed onto the line. The mechanism through which this head engages with the pipe is well known to those familiar with the art of laying pipe lines and need not be described specifically herein. A shaft 21 is connected at one end to the driven shaft 6 and at its other end to the head 19, through the medium of universal connections or joints. When the driven shaft 6 is rotated it is obvious that the pipe section 20 will also be rotated. If in making the connection, the threads properly mesh, the section 20 will easily rotate until said joint is screwed onto the line, but if the threads become crossed the additional load will cause the connection between the driving and driven members to slip so that said threads will not be mutilated and ruined, and in that event, the section 20 is re-alined and the process repeated until the threads properly mesh.

Fixed upon the shaft 6 there is a large spur gear wheel 22 and splined upon the shaft 5 there is a small spur gear wheel 23 which may be manipulated into and out of mesh with the gear 22, through the hand lever 24.

When the section 20 is screwed onto the line, the gear wheel 23 is then moved into mesh with the gear wheel 22 making a positive connection between the driving and driven shafts through which sufficient power is transmitted to the driven shaft to screw the joint up tight so that it will not leak.

What I claim is:—

1. In apparatus for screwing together sections of pipe, a driving member adapted to be placed in operative connection with a source of power, a pipe engaging head, a driven member in operative connection with said head, a clutch whereby said driving member may be placed in operative connection with said driven member and arranged to deliver only a predetermined amount of power from the former to the latter, and a driving connection by which said driving member may be positively placed in operative connection with the driven member.

2. In apparatus for screwing together sections of pipe, a driving shaft adapted to be power operated, a pipe engaging head, a driven shaft in operative connection with said head, means by which said driving shaft may be placed in operative connection with said driven shaft, said connection being adapted to carry a predetermined load and to slip when said load is exceeded, and a connection by which said driving shaft may be positively placed in operative connection with the driven shaft.

In testimony whereof I have signed my name to this specification in the presence of two subscribing witnesses.

JESSE E. CROCKETT.

Witnesses:
  JAS. W. OLIVER,
  E. V. HARDWAY.